United States Patent
Fol et al.

(10) Patent No.: US 8,100,358 B2
(45) Date of Patent: Jan. 24, 2012

(54) METHOD OF REDUCING THE COMPRESSIBILITY DRAG OF A WING, AND CONTAINER IMPLEMENTING THE METHOD

(75) Inventors: Thierry Fol, Grenade (FR); Cyril Bonnaud, Toulouse (FR)

(73) Assignee: Airbus France, Toulouse (FR)

( * ) Notice: Subject to any disclaimer, the term of this patent is extended or adjusted under 35 U.S.C. 154(b) by 572 days.

(21) Appl. No.: 12/255,296

(22) Filed: Oct. 21, 2008

(65) Prior Publication Data
US 2010/0044519 A1    Feb. 25, 2010

(30) Foreign Application Priority Data

Oct. 22, 2007    (FR) ................................. 07 07365

(51) Int. Cl.
*B64B 1/62*    (2006.01)
(52) U.S. Cl. .................................................. 244/99.12
(58) Field of Classification Search ............... 244/54, 244/99.12, 137.4, 135 R
See application file for complete search history.

(56) References Cited

U.S. PATENT DOCUMENTS

| | | | |
|---|---|---|---|
| 2,950,879 A | 8/1960 | Smith | |
| 2,967,030 A | 1/1961 | Whitcomb | |
| 3,468,501 A * | 9/1969 | Baum | 244/137.4 |
| 5,102,069 A * | 4/1992 | Hackett et al. | 244/54 |
| 7,610,841 B2 * | 11/2009 | Padan | 89/1.815 |

FOREIGN PATENT DOCUMENTS

| | | |
|---|---|---|
| DE | 932410 | 9/1955 |
| EP | 112929 | 7/2007 |
| FR | 2898336 | 9/2007 |

OTHER PUBLICATIONS

Wikipedia, the free encyclopedia, http://en.wikipedia.org/wiki/Lockheed_AC-130, Mar. 31, 2011.*
Kutney J T et al., "Reduction of drag rise on convair 990 Airplane", Journal of Aircraft, AIAA, Reston, VA US, vol. 1, No. 1, Jan. 1, 1964, pp. 8-12.
Search Report dated Jun. 13, 2008, in French Application.

* cited by examiner

*Primary Examiner* — Tien Dinh
*Assistant Examiner* — Keith L Dixon
(74) *Attorney, Agent, or Firm* — Brooks Kushman P.C.

(57) ABSTRACT

The present invention provides a method of reducing the compressibility drag of wing, and it also provides a container implementing the method. The container (10, 10', 10") is provided successively with a front portion (11) in the vicinity of its leading edge (14), then with an intermediate portion (12), and then with a rear portion (13) in the vicinity of its trailing edge (15), said rear portion (13) tapering progressively in a direction going from the leading edge (14) of the container towards its trailing edge (15). Furthermore, said rear portion (13) is extended by connection means (17) enabling the container (10, 10', 10") to be connected under the wing (1) in such a manner that said tapering rear portion (13) is partially upstream from the leading edge (2) of the wing (1).

10 Claims, 2 Drawing Sheets

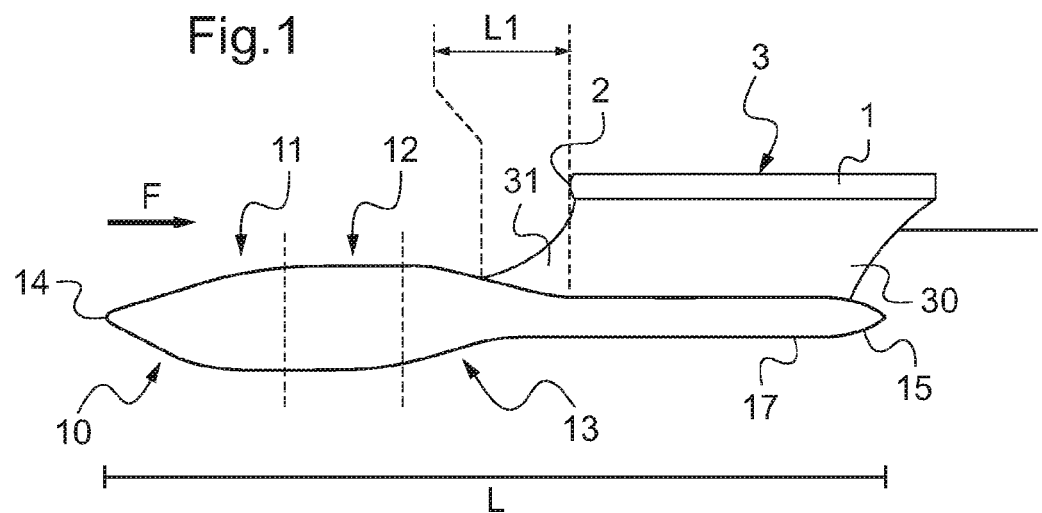
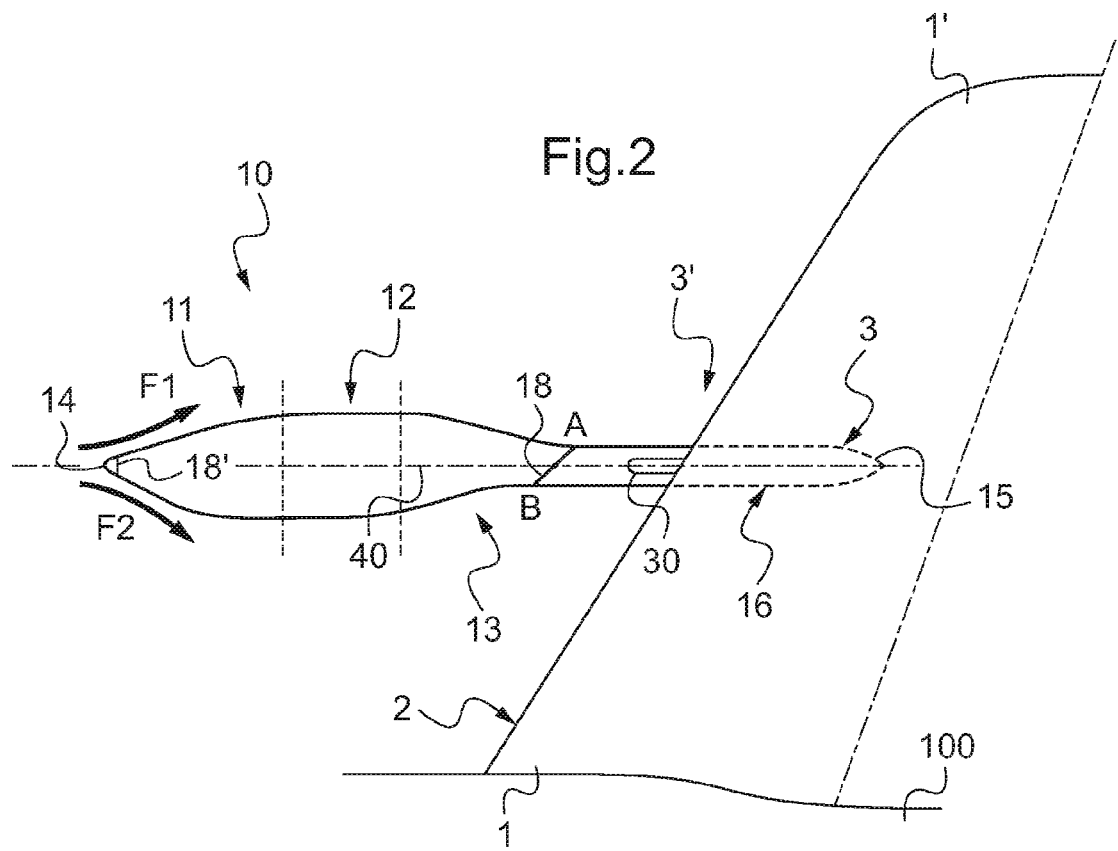

METHOD OF REDUCING THE COMPRESSIBILITY DRAG OF A WING, AND CONTAINER IMPLEMENTING THE METHOD

FIELD OF THE INVENTION

The present invention relates to a method of reducing the compressibility drag of an aircraft wing, and to a container suitable for implementing the method.

BACKGROUND OF THE INVENTION

Conventionally, an aircraft is provided with wings that provide it with lift, the wings being disposed on either side of the fuselage of an airplane, for example.

When the aircraft is moving, the top surface of the wing, also known as the "suction side" surface, is subjected to suction forces. In contrast, the bottom face of the wing, also known as the "pressure side" surface, is subjected to pressure forces.

The aerodynamic resultant of these pressure and suction forces then gives rise firstly to lift perpendicular to the relative wind, thereby lifting the wing, and secondly to drag that slows down the profile and pointlessly absorbs energy, with a portion of this drag being known as "compressibility drag" when there are supersonic zones present that engage the wing.

It should be observed that compressibility drag is maintained at a relatively constant level until the wing reaches a determined speed relative to the air flow, corresponding to the drag divergence Mach number of the wing. Mach number is equal to the quotient of speed divided by the speed of sound, and the drag divergence Mach number is defined by the person skilled in the art as the Mach number from which compressibility drag diverges and increases suddenly.

Under such conditions, the design of an aircraft wing is the result of a compromise between various factors such as the desired lift, the drag generated by the wing, or indeed the structural strength of the wing.

Nevertheless, over time, the definition of an aircraft is called on to change in order to satisfy user requirements, e.g. in order to increase its payload. Such changes may require an increase in the lift generated by the wing.

In general, the person skilled in the art solves such a problem by increasing the overall angle of attack of the aircraft.

Although initially effective, that technique sometimes leads to unexpected drawbacks. The increase in the lift of the wing is accompanied by a corresponding increase in its drag, and in particular its compressibility drag.

Unfortunately, compressibility drag diverges spectacularly starting from a defined speed for the flow of air over the suction surface of the wing, corresponding to the drag divergence Mach number. It is then possible, in certain critical zones of the wing, for the increase in lift not to compensate the harmful effects created by the large increase in compressibility drag.

One solution to that problem would be to cause the aircraft to fly at a lower altitude. However that solution leads to a significant degradation in aircraft flight conditions.

Thus, in order to avoid degrading such flight conditions, the person skilled in the art has until now had only one solution for countering this phenomenon. That solution consists in changing the shape of the wing so as to obtain once more an acceptable compromise between lift and compressibility drag.

That situation is nevertheless penalizing, since designing a new wing and making it can be very expensive. In addition, the same goes to modifying existing aircraft that are to be fitted with a new wing.

A method is known for reducing compressibility drag in at least one critical zone of an aircraft wing, which method is remarkable wherein at least one container is placed under the wing, the container having a rear portion in the vicinity of its trailing edge that tapers in a direction going away from the leading edge of the container towards its trailing edge. That rear portion of the container is arranged at least in part upstream from the leading edge of the wing so that the container slows down the speed of the air upstream from the critical zone that is to be treated so as to reduce the compressibility drag of the wing.

For example, document DE 932410 discloses a method of reducing the compressibility drag of at least one critical zone of an aircraft wing, under which at least one container is fastened that has a rear portion in the vicinity of its trailing edge that tapers in a direction going away from the leading edge of the container towards its trailing edge.

The rear portion is arranged at least in part upstream from the leading edge of the wing so that the container slows down the speed of air upstream from the critical zone in order to reduce its compressibility drag.

In addition, said container is fastened under the wing via fastener means having a front end that projects as much as possible from the leading edge of the wing through a distance L1 of the order of the length L of the container.

OBJECT AND SUMMARY OF THE INVENTION

An object of the present invention is to provide a method of reducing the compressibility drag of an aircraft wing, e.g. an airplane wing, that enables the above-mentioned drawbacks to be overcome and that does not require the aircraft wing to be modified.

According to the invention, advantageously, said container is given a shape that is asymmetrical so that the isobar lines surrounding the outer periphery of the container are parallel to the leading edge of said wing in said critical zone.

This particular arrangement of a container having a tapering rear portion in the vicinity of its trailing edge, serves to reduce the flow speed of the air upstream from the wing, thereby implying a reduction in compressibility drag. The divergence Mach number is no longer reached on the suction side of the wing, with compressibility drag remaining at a level that is acceptable. This avoids any need to redesign the wing, locally or even completely.

The result obtained is surprising and unexpected given existing prejudices. Until now, aircraft manufacturers have been of the opinion that elements connected under a wing tend to degrade the flow and the drag of the wing rather than providing an improvement. Engine fairings constitute a perfect example.

This prejudice is particularly understandable when the container generates its own drag and generally accelerates the flow incident on the wing. It is therefore natural for the person skilled in the art to be pursuaded that the compressibility drag of the wing would be degraded by adding the drag specific to the container and by the interaction between the container and the wing.

Nevertheless, by overcoming this prejudice, the method of the invention makes it possible to reduce effectively the compressibility drag of a critical zone of a wing.

Furthermore, the invention provides a non-negligible advantage insofar as the container can also be used as such.

In a first variant, the container also constitutes an additional fuel tank. In a second variant, the container constitutes an equipment housing, e.g. for electronic equipment such as radars.

Consequently, the method of the invention not only prevents compressibility drag divergence, but also serves in the first variant significantly to increase the range of the aircraft without any particular penalty.

In flight, the flow of air around the container imposes a pressure field on the outer periphery of the container. It is thus possible to define isobar lines around the container, i.e. lines passing through points that are subjected to the same pressure.

The asymmetrical shape of the container is then selected in such a manner as to give a particular orientation to the isobar lines. More particularly, the asymmetrical shape of the container implies that the isobar lines are parallel to the leading edge of the wing, in register with the critical zone that is to be treated in order to avoid compressibility drag divergence.

This characteristic thus helpfully maximizes the efficiency of the method.

In addition, the container is connected under the wing via fastener means having a front end that projects as far as possible ahead of the leading edge of the wing through a maximum distance of the order of the length of the container, this length representing the distance the leading edge of the container and its trailing edge. Seen from above, the fastener means are not completely covered by the wing, but project from the wing, ahead of its leading edge through this maximum distance.

Furthermore, it can be advantageous to make provision for a plurality of containers to be arranged under the wing. For example, for a wing possessing at least one airfoil extending transversely relative to the fuselage of an aircraft to a free end of the wing, this airfoil carrying first and second engines, a first container is connected under the wing between the first and second engines, and then a second container is connected between the second engine and said free end.

This engine/container sequence going from the fuselage serves to maximize the effects produced by each container.

The present invention provides a method of reducing the compressibility drag of a wing, and it also provides a container for implementing the method.

Such an aircraft container suitable for implementing the method of the invention is provided in succession with a front portion in the vicinity of its leading edge, then with an intermediate portion, and then with a rear portion in the vicinity of its trailing edge, the rear portion tapering progressively in a direction going from the leading edge of the container towards its trailing edge, said rear portion being extended by elongate connection means enabling the container to be connected under the wing in such a manner that its tapering rear portion is located in part upstream from the leading of the wing.

According to the invention, defining a generator line as being a straight line for generating a surface on being rotated, the container comprises a plurality of generator lines defining its rear portion. These generator lines are then advantageously parallel to the leading edge of the wing in register with the zone where the container is connected to the wing.

As explained above, this then gives the container the unexpected and surprising ability to reduce the compressibility drag of the wing by slowing down the flow of air upstream from the leading edge of the wing.

It should be observed that the generator lines are therefore not necessarily perpendicular to the longitudinal axis of the container, but on the contrary present an angle relative to said longitudinal axis in order to remain parallel to the leading edge of the wing.

Consequently, each generator line generates a profile of section that is parallel to the leading edge of the wing.

The air flow through which the container passes then reaches the wing perpendicularly to the leading edge of said wing, thereby maximizing the looked-for effect, i.e. a reduction in the compressibility drag of the wing.

Each of the rear and front portions of the container are thus asymmetrical relative to the longitudinal axis of the container defined as going through the leading edge and through the trailing edge of the container. Similarly, and where necessary, the intermediate portion is asymmetrical relative to said longitudinal axis.

Finally, the container is advantageously removable so as to enable it to be removed if the flight of the aircraft does not require such a container to be used.

BRIEF DESCRIPTION OF THE DRAWINGS

The invention and its advantages appear in greater detail in the context of the following description of embodiments given by way of illustration with reference to the accompanying figures, in which:

FIG. 1 is a side view of a wing fitted with a container of the invention;

FIG. 2 is a plan view of a wing fitted with a container of the invention;

MORE DETAILED DESCRIPTION

Figure 3:
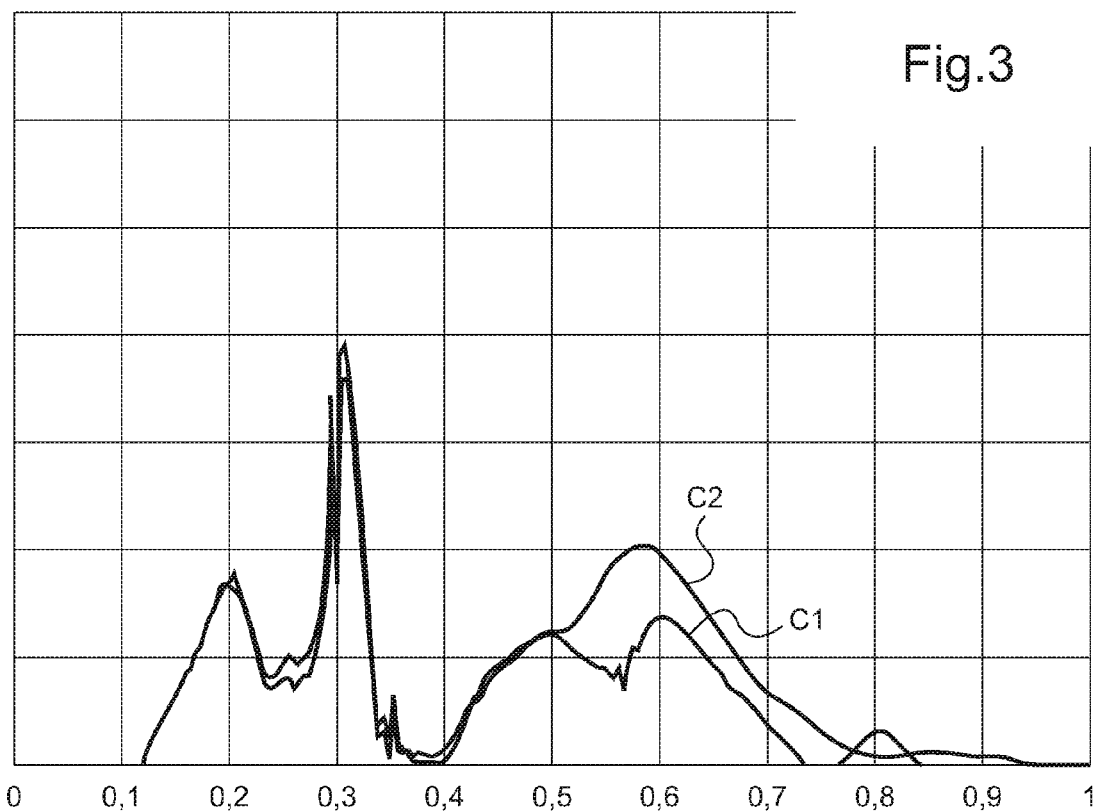
FIG. 3 is a diagram showing the surprising effects of the invention.

Elements present in more than one figure are given the same references in each of them.

FIG. 1 is a side view of a wing 1 fitted with a removable container 10 of the invention.

The container 10 has a front portion 11 extending from its leading edge 14, followed by an intermediate portion 12, and then by a rear portion 13 going to a trailing edge 15 of the container.

The outer periphery of the front portion 11, and possibly of the intermediate portion 12, flares progressively going from the leading edge 14 towards the trailing edge 15 of the container.

In contrast, the rear portion 13 tapers in the same direction.

In accordance with the method of the invention, the container is arranged under the wing 1 in such a manner that its tapering rear portion 13 is located at least in part upstream from the leading edge 2 of the wing 1, where "upstream" and "downstream" are defined relative to the flow direction F of the air through which the aircraft passes.

The container 10 then slows down the flow speed of the air, thereby making it possible to prevent the flow reaching the drag divergence Mach number in the critical zone 3 of the wing.

Surprisingly, the compressibility drag generated by the assembly comprising the container 10 and the wing 1 in the vicinity of the critical zone 3 is less than the compressibility drag generated by the wing 1 in the absence of the container 10.

In order to be capable of being secured in the position determined by the above-described method, the rear portion 13 of the container is extended by elongate connection means 17 that are fastened to fastener means 30 of the wing 1. It will readily be understood that the connection means 17 form an integral portion of the container, which container is thus provided in succession with a front portion 11, an intermediate portion 12, and a rear portion 13 that is extended by the elongate connection means 17.

The fastener means 30 are arranged on the pressure side of the wing 1. The front end 31 of the fastener means 30 then projects from as far as possible from the leading edge 2 of the wing 1, by a maximum distance L1 that is of the same order as the length L of the container 10.

Thereafter, by applying this step of the method, it is ensured that the fastener means will not have any harmful effect on the compressibility drag of the critical zone 3 of the wing 1 by disturbing the flow of air.

FIG. 2 is a plan view of the wing 1, providing with an airfoil extending from the fuselage 100 of an aircraft to a free end 1' of the wing, fitted with the container 10.

The container 10 is made on the basis of a plurality of generator lines 18, 18' at respective angles relative to a longitudinal axis 40 of the container 10 and going from the leading edge 14 to the trailing edge 15 of the container. Rotating these generator lines about the longitudinal axis 40 serves to generate the outer periphery of the container 10.

The generator lines 18 are substantially perpendicular to the longitudinal axis 40 at the leading edge 14 of the container and then inclined regularly relative to said longitudinal axis 40 on going from the leading edge 14 towards the trailing edge 15.

Optionally, in an alternative variant of the invention, the generator lines 18 are inclined relative to the longitudinal axis 40 starting from the leading edge 14 so that they are never perpendicular to said longitudinal axis 40.

In the tapering rear portion 13 of the container 10, the generator lines 18 are thus parallel to the leading edge 2 of the wing in register with the critical zone 3, i.e. in the zone 3' where the container 10 is connected to the wing 1.

This configuration requires the container 10 to have a shape that is asymmetrical relative to the geometrical axis 40.

This technical characteristic is important since it enables the reduction in compressibility drag of the wing 1 to be as great as possible.

A first particle of air running along a first side of the container as shown by arrow F1 will then have a speed that is faster than that of a second particle of air running along a second side of the container as shown by arrow F2.

When the first particle reaches point A, the second particle will only have reached point B. These two particles thus induce pressures on the container that are identical, so an isobar line surrounding the periphery of the container passes through the points A and B.

Like the generator line 18, this isobar line is then parallel to the leading edge 2 of the wing 1.

In general, the same applies to the isobar lines surrounding the periphery of the container at the rear portion 13.

The flow of air is then well positioned on reaching the wing 1, thereby avoiding the flow of air reaching the drag divergence Mach number.

Thus, the method and the container of the invention prevent divergence drag being created without there being any need for the aircraft manufacturer to modify the wing, thereby achieving significant savings in terms of cost.

The resulting saving is also advantageously accompanied by increased carrying capacity since the container 10 can be filled with fuel or with equipment required for flying the aircraft, e.g. radars.

FIG. 3 is a diagram showing the surprising effects of the invention, showing the production of compressibility drag as a function of the wing span of the airfoil.

Curves C1 and C2 relate to drag production, respectively when the airfoil is or is not fitted with a container of the invention.

It can be seen that the presence of the container gives rise, in surprising manner, to a considerable reduction of compressibility drag in a precise sector of the airfoil, situated at a distance from the fuselage that lies in the range 0.5 times to 0.7 times the span.

Contrary to existing prejudices, the container does indeed enable the compressibility drag of the wing to be reduced.

Figure 4:
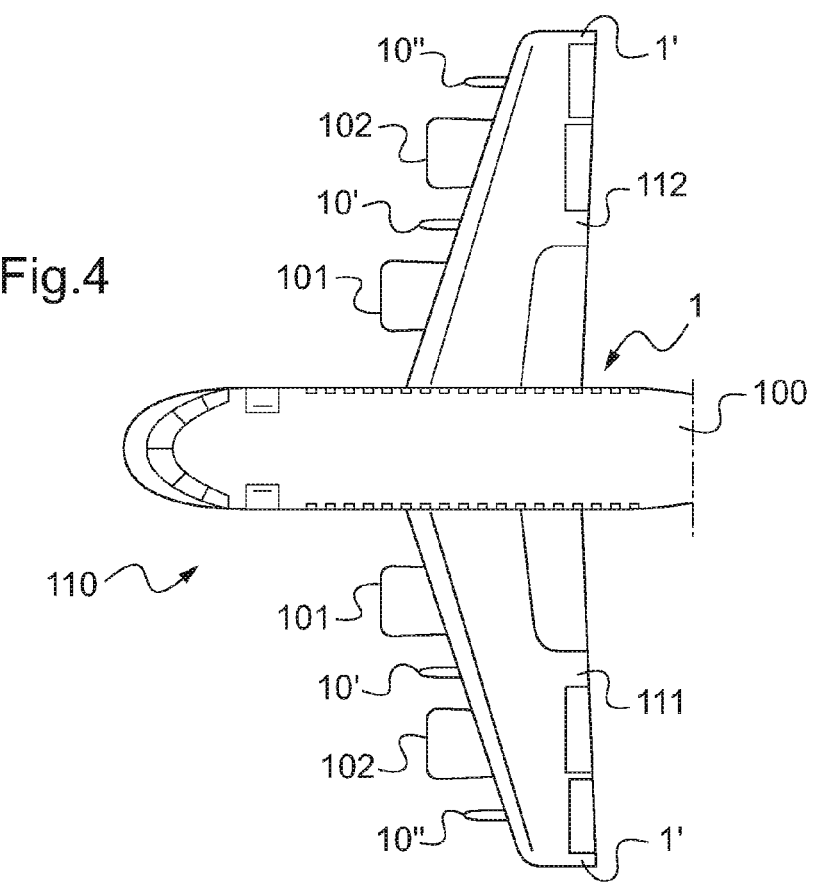
FIG. 4 is a plan view of a wing fitted with an airfoil having first and second engines.

FIG. 4 is a plan view of a four-engined aircraft with a wing 1 comprising first and second airfoils 111, 112, i.e. wings. Each airfoil 111, 112 is then fitted with first and second engines that are located between the fuselage 100 of the aircraft and a free end 1', i.e. the tip of the corresponding wing.

Under these conditions, each airfoil has first and second containers of the invention for the purpose of reducing the compressibility drag of the wing 1.

Consequently, the first container 10' is located between the first and second engines 101, 102, while the second container 10" is located between the second engine 102 and the free end 1' of the airfoil.

Naturally, the present invention is capable of numerous modifications as to its implementation. Although several embodiments are described, it will readily be understood that it is not conceivable to identify exhaustively all possible embodiments. It is naturally possible to envisage replacing any of the means described by equivalent means without thereby going beyond the ambit of the present invention.

What is claimed is:

1. A method of reducing the compressibility drag of at least one critical zone of the wing of an aircraft, the method comprising placing under said wing at least one container having a rear portion at the trailing edge of the container that tapers going away from the leading edge of the container towards the trailing edge, said rear portion being arranged at least in part upstream from the leading edge of said wing so that said container slows down the speed of the air upstream from said critical zone in order to reduce its compressibility drag, wherein the said container is given a shape that is asymmetrical so that the isobar lines surrounding the outer periphery of the container are parallel to the leading edge of said wing in said critical zone; and wherein the said container is for a generator line constituted by a straight line used for generating a surface on being rotated, said container having a plurality of generator lines in register with said rear portion, said generator lines being parallel to the leading edge of the wing in register with the zone where said container is connected to the wing.

2. A method according to claim 1, wherein the said container is connected under the wing by fastener means having a front end projecting from the leading edge of the wing by a maximum distance (L1) of the order of the length (L) of the container.

3. A method according to claim 1, wherein the said wing possesses at least one airfoil extending transversely to a fuselage of the aircraft to a free end of the wing, said airfoil carrying first and second engines, a first container being connected under the wing between the first and second engines, and a second container being connected between the second engine and said free end of the wing.

4. A method according to claim 1, wherein said rear and front portions of the container are asymmetrical relative to a longitudinal axis going from the leading edge of the container to the trailing edge of said container.

5. A method according to claim 1, wherein the said container is removable.

6. A container of an aircraft suitable for reducing the compressibility drag of at least one critical zone of a wing of an aircraft, the container placed under said wing, said container comprising:
- a front portion in the vicinity of a leading edge of the container;
- an intermediate portion;
- a rear portion in the vicinity of a trailing edge of the container; wherein said rear portion tapers progressively going away from the leading edge of the container towards the trailing edge of the container, wherein said rear portion is extended by connection means enabling the container to be connected under the wing in such a manner that said tapering rear portion is located in part upstream from the leading edge of the wing so that said container slows down the speed of the air upstream from said critical zone in order to reduce the compressibility drag of the wing; and
- a plurality of generator lines in register with said rear portion, said generator lines being parallel to the leading edge of the wing in register with a zone where said container is connected to the wing, each generator line constituted by a straight line used for generating a surface on being rotated;

wherein said container is given a shape that is asymmetrical so that the isobar lines surrounding the outer periphery of the container are parallel to the leading edge of said wing in said critical zone.

7. A container according to claim 6, wherein said rear and front portions of the container are asymmetrical relative to a longitudinal axis going from the leading edge of the container to the trailing edge of said container.

8. A container according to claim 6, wherein the said container is removable.

9. An aircraft comprising:
a fuselage; and
a wing possessing at least one airfoil extending transversely to the fuselage of the aircraft to a free end of the wing, said airfoil carrying first and second engines, a first container according to claim 6 being connected under the wing between the first and second engines, and a second container according to claim 6 being connected between the second engine and said free end of the wing.

10. An aircraft comprising:
a fuselage; and
a wing possessing at least one airfoil extending transversely to the fuselage of the aircraft to a free end of the wing, said airfoil supporting a container according to claim 6 being connected under the wing by fastener means having a front end projecting from the leading edge of the wing by a maximum distance (L1) of the order of the length (L) of the container.

* * * * *